(12) United States Patent  (10) Patent No.: US 7,026,748 B2
Wammes  (45) Date of Patent: Apr. 11, 2006

(54) LIGHTING UNIT FOR FLAT PANEL DISPLAY DEVICE

(75) Inventor: Klaus Wammes, Bechtheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/092,618

(22) Filed: Mar. 30, 2005

(65) Prior Publication Data

US 2006/0006776 A1  Jan. 12, 2006

Related U.S. Application Data

(63) Continuation of application No. PCT/DE03/003256, filed on Sep. 30, 2003.

(30) Foreign Application Priority Data

Sep. 30, 2002  (DE)  ............................... 102 45 871

(51) Int. Cl.
*H01J 1/02*  (2006.01)
*H01J 61/52*  (2006.01)
*H01J 7/24*  (2006.01)
*H01K 1/58*  (2006.01)

(52) U.S. Cl. ............................ 313/46; 313/44; 313/45; 362/580; 362/218

(58) Field of Classification Search ................... 313/46
See application file for complete search history.

(56) References Cited

U.S. PATENT DOCUMENTS 4,691,267 A  9/1987  Giesberg
5,993,027 A *  11/1999  Yamamoto et al. ......... 362/294
6,089,739 A  7/2000  Yamamoto et al.

FOREIGN PATENT DOCUMENTS

DE  195 33 323 A1  3/1997
JP  58059843 A  4/1983
JP  09073810 A  3/1997

* cited by examiner

*Primary Examiner*—Mariceli Santiago
*Assistant Examiner*—Elizabeth Rielley
(74) *Attorney, Agent, or Firm*—Sughrue Mion, PLLC

(57) ABSTRACT

A lighting unit (1) preferably providing backlighting for a flat display device (2) and operating substantially in a vertical working position. The lighting unit (1) includes lamps (3), which are in thermal contact with a heat-conducting wall (5) of a hollow box (6). The lamps (3) make thermal contact with the heat-conducting wall (5) on the side opposite the light-emitting side of the lighting unit (1). The hollow box (6) is provided with a rear wall (8) that runs essentially parallel to the heat-conducting wall (5) and has openings (9) which are distributed across the area thereof. A top sidewall (10) and a bottom sidewall (11) are provided with additional openings (12, 13) in zones that lie closer to the rear wall (8). Preferably, the sidewalls do not have openings in zones located closer to the heat-conducting wall (5) than the additional openings (12, 13).

16 Claims, 2 Drawing Sheets

LIGHTING UNIT FOR FLAT PANEL DISPLAY DEVICE

This is a Continuation of International Application PCT/DE2003/003256, with an international filing date of Sep. 30, 2003, which was published under PCT Article 21(2) in German, and the disclosure of which is incorporated into this application by reference.

FIELD AND BACKGROUND OF THE INVENTION

The invention relates to a lighting unit, which provides backlighting for a flat panel display device.

Flat panel display devices that are not self-luminous, such as liquid crystal displays, require backlighting in the form of a lighting unit that is as flat as possible. The lighting unit typically has a plurality of lamps, which are distributed across a light-emitting area of the lighting unit. The lamps are usually fluorescent lamps, for example, cold cathode fluorescent lamps (CCFLs). The light of the lighting unit is uniformly distributed over the light-emitting area by means of light-guiding elements, diffusing screens or the like. Light exiting the rear of the lamps is directed toward the light-emitting side by means of a reflector, which is arranged on the backside of the lamps. Since many flat panel displays, particularly daylight-capable flat panel displays, require that the luminous intensity of the lighting unit be high, the heat generated is also high and must be effectively dissipated in view of the compact structure of the lighting unit. Furthermore, particularly in fluorescent lamps, the brightness is temperature dependent and reaches a maximum at a specific working temperature. Thus, a design goal for the lighting unit is to obtain a uniform brightness across the light-emitting area of the lighting unit by achieving a constant, uniform working temperature for all the lamps while maximizing the luminous efficiency.

OBJECTS OF THE INVENTION

Thus one object of the invention is to create effective heat dissipation and uniform brightness distribution in a lighting unit, which has a high luminous efficiency without the need for an active cooling means, such as fans.

SUMMARY OF THE INVENTION

According to an embodiment of the invention, a lighting unit, which provides backlighting for a flat panel display device and operates substantially in a vertical working position, comprises lamps in thermal contact with the outside of a heat-conducting wall of a hollow box. The lamps thermally contact the heat-conducting wall on the side opposite the light-emitting side of the lighting unit. The hollow box further comprises a rear wall that extends substantially parallel to the heat-conducting wall, and the rear wall is provided with openings that are distributed across the surface area of the rear wall. The hollow box also comprises sidewalls, which include a top sidewall and a bottom sidewall located at the top and bottom of the hollow box, respectively, relative to the vertical working position. The top sidewall and the bottom sidewall comprise additional openings in zones that lie close to the rear wall. Preferably, the sidewalls do not have openings in zones located close to the heat-conducting wall.

The lamps are in thermal contact with the heat-conducting wall, which equalizes the temperature among the lamps such that the lamps all have approximately the same working temperature. Thus, the lamps do not substantially differ in brightness. Preferably, but not necessarily, the lamps thermally contact the heat-conducting wall via a reflective layer that is placed therebetween. The reflective layer may be a coating applied to the wall or a separate thin foil.

When heated by the lamps, the heat-conducting wall radiates the heat into the interior of the hollow box and heats the air contained therein. Preferably, the heat-conducting wall is black on the side facing the interior of the hollow box in order to maximize the heat that is radiated through the heat-conducting wall.

The heated air in the hollow box exits through openings at the top of the hollow box similar to a chimney. While heated air exits through the top, fresh air flows in from the outside through openings at the bottom of the hollow box. Since the openings in the sidewalls at the top and at the bottom are formed only in zones close to the rear wall, the air, which flows upward due to the chimney effect, is transported directly along the rear wall of the hollow box. In addition, openings in the rear wall prevent the airflow from becoming laminar and having a zero velocity at the interface with the rear wall. Instead, eddies form along the edges of the openings, which act like fans. Accordingly, airflow velocity along the interface with the rear wall does not equal zero. Thus, heat also dissipates through the rear wall. In addition to the openings, the rear wall of the hollow body may also comprise projections that protrude into the interior thereof and contribute to the turbulence of the air. As the heat generated by the lamps increases, the heat-conducting wall becomes hotter, which increases the chimney effect and the heat dissipation created thereby. Accordingly, the temperature of the lamps is regulated to an approximately constant level.

To obtain the proper chimney effect, the total area of all the openings in the rear wall is preferably smaller than the remaining area of the rear wall. Preferably, the openings are formed as slots, with the slots in the rear wall being vertically oriented. In addition, openings in areas where the rear wall and the sidewalls at the top and bottom directly adjoin may merge into each other, i.e., the openings are formed partly in the rear wall and partly in the respective sidewall.

Preferably, the hollow box has a two-part construction with respect to the materials. The heat-conducting wall forms one part while the other walls of the hollow box form the other part and are made of a material that conducts heat relatively poorly. The heat-conducting wall may be made of, for example, copper or aluminum while the remaining walls of the hollow box are made of, for example, a high-grade steel. As a result, the temperature of the rear wall is lower than that of the heat-conducting wall creating a temperature gradient between the two walls. Because the air at the top of the hollow box is hotter, the temperature gradient decreases from the bottom to the top of the hollow box. This difference in the temperature gradient enhances the chimney effect. Accordingly, the distance between the two walls can be very small without causing thermal blocking of the chimney.

If the lamps are fluorescent tubes driven by alternating voltages of relatively high frequency, for example, 100 kHz, parasitic capacitances appear between the lamps and the heat-conducting wall, which is typically metallic and which thermally contacts the lamps. The parasitic capacitances draw a considerable part of the driving power from the lamps. Thus, in contrast to the conventional high-impedance drivers of fluorescent lamps that use a current limiting ballast capacitor, the fluorescent lamps of this embodiment are preferably connected to a driver circuit with low output impedance. Accordingly, the fluorescent lamps are advantageously connected directly, that is, without a ballast capacitor, to an inductive output transformer of the driver circuit. The output transformer is configured to limit the transmitted power of the output transformer.

BRIEF DESCRIPTION OF THE DRAWINGS

An illustrative, non-limiting embodiment of the invention will now be described in greater detail with reference to the drawing figures, in which.

DETAILED DESCRIPTION OF THE PREFERRED EMBODIMENTS

Figure 1:
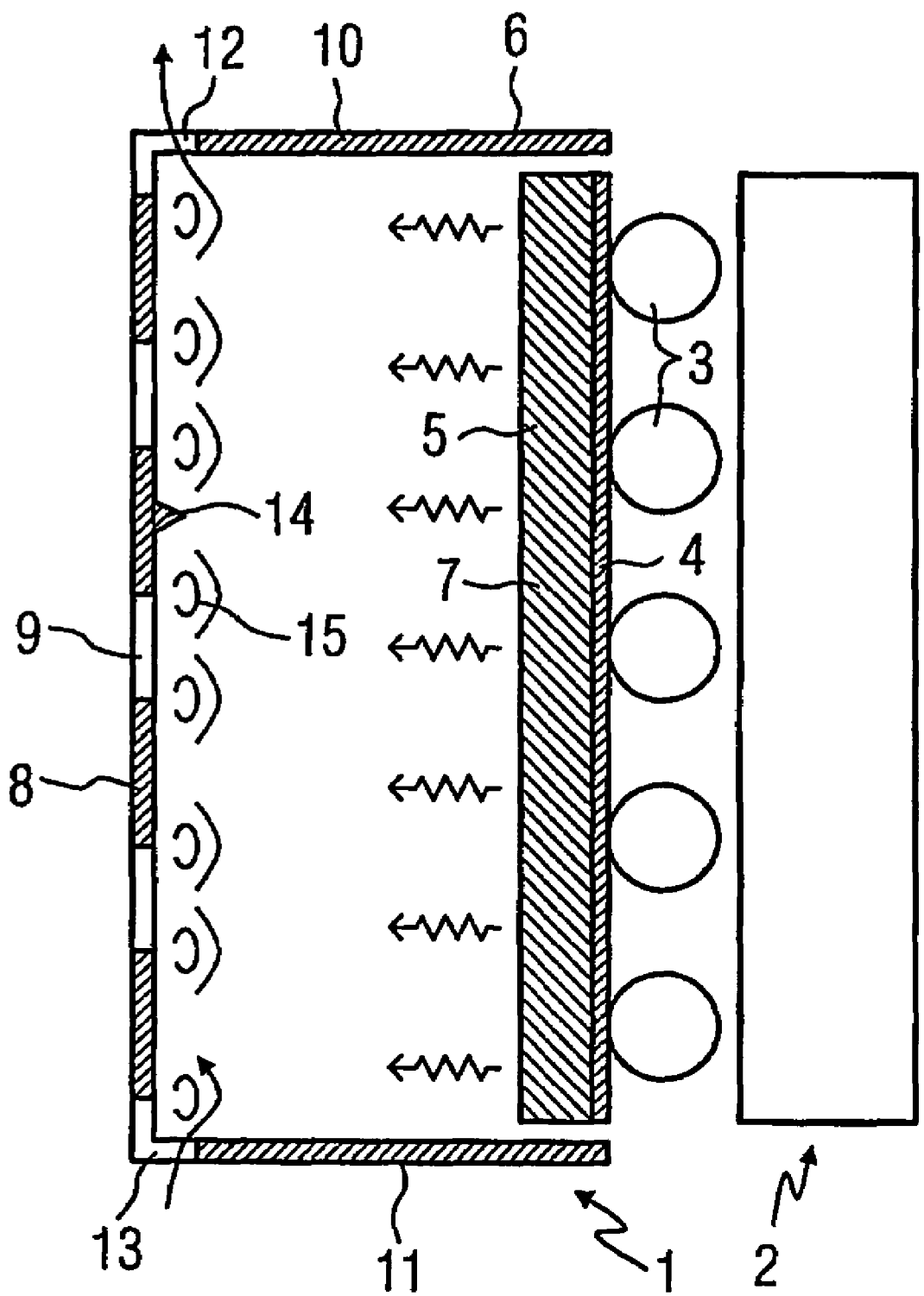
FIG. 1 shows an exemplary embodiment in cross section of the lighting unit according to the invention in conjunction with a flat panel display.
Figure 2:
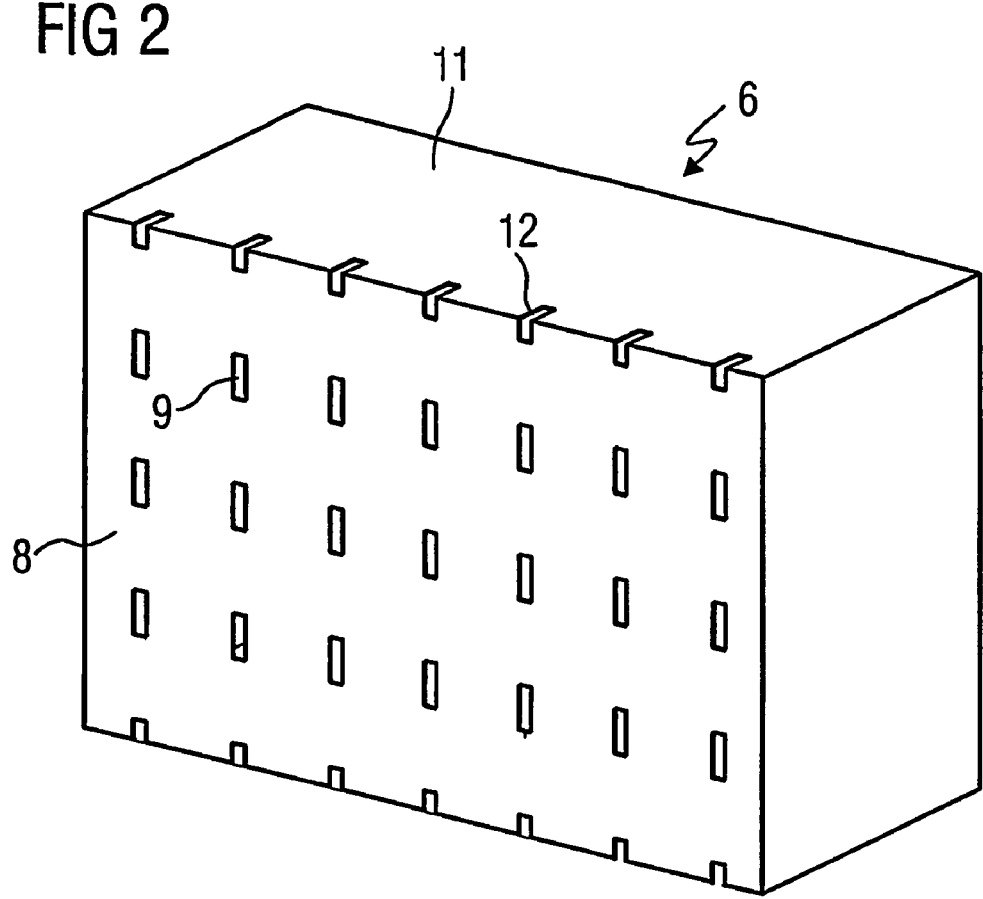
FIG. 2 is a rear view of the lighting unit.

FIG. 1 is a schematic representation of a lighting unit 1 that provides backlighting for a flat panel display 2, in this case a liquid crystal display. The lighting unit 1 and the flat panel display 2 are operated substantially in a vertical working position, as depicted in FIG. 1. On its light-emitting side, the lighting unit 1 is provided with a plurality of lamps 3 distributed over the light-emitting area and parallel to each other. In this case, the lamps 3 are cold cathode fluorescent tubes. The backside of the lamps is in thermal contact with a heat-conducting wall 5 of a hollow box 6, with a reflective layer 4 placed therebetween. The backside of the hollow box is illustrated in FIG. 2. The heat-conducting wall 5 comprises a comparatively thick aluminum plate, which, on the side 7 facing the interior of the hollow box 6, is dyed or coated black. The other parts of the hollow box 6 are made of materials that conduct heat relatively poorly, in this case high-grade steel, and includes a rear wall 8 extending parallel to the heat-conducting wall 5 and sidewalls located between the heat-conducting wall 5 and the rear wall 8. The rear wall 8 is provided with openings 9, and the top sidewall 10 and the bottom sidewall 11 are provided with openings 12 and 13, respectively. The openings 12 and 13 are provided only in the zones of the sidewalls 10 and 11 that are located close to the rear wall 8. The total area of the openings 9 formed in the rear wall 8, which in this case take the form of vertical slots, is smaller than the remaining area of the rear wall 8. In the area where the rear wall 8 adjoins the top sidewall 10 and the bottom sidewall 11, the openings 9 formed in the rear wall 8 and the openings 12 and 13 in the respective sidewalls 10 and 11 merge into each other. In other words, the openings are located partly in the rear wall 8 and partly in the respective sidewall 10 or 11. In addition to the openings 9 formed in the rear wall 8, the rear wall may also have projections, identified here by 14, which protrude into the interior of the hollow box 6. These projections 14 may be formed, for example, by bending up the edges of the openings 9 into the interior of the hollow box 6.

The heat-conducting wall 5 equalizes the temperature among the lamps 3 and radiates the heat dissipated by the lamps 3 across its black side 7 into the interior of the hollow box 6. This heats the air inside the hollow box 6. As a result of the arrangement of the openings 12 and 13 formed in the sidewalls 10 and 11 close to the rear wall, heated air rises along the rear wall 8. As the heated air leaves the hollow box 6 through the openings 12 in the top sidewall 10, fresh air flows in from the outside through the openings 13 in the bottom sidewall 11. Because of the openings 9 in the rear wall, the airflow 15 moving along the rear wall 8 is not laminar but turbulent, which enhances the heat transfer between the rear wall 8 and the heated air.

Figure 3:
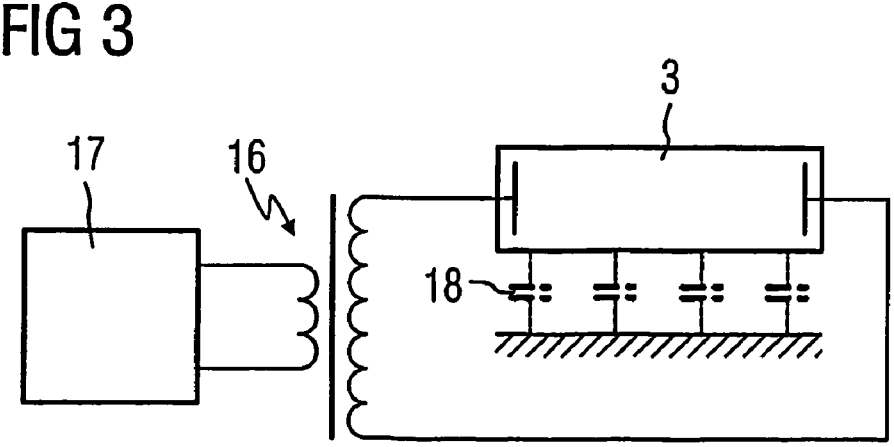
FIG. 3 is an example of the driver of the lamps used in the lighting unit.

FIG. 3 schematically illustrates the driver of the cold cathode fluorescent lamps 3. As shown by means of the example of a single lamp 3, the lamps are connected directly, without a ballast capacitor, to an inductive output transformer 16 of a driver circuit 17. Thus, the driver of the lamp 3 is low-impedance, for example on the order of approximately 10 ohm. Accordingly, the parasitic capacitances 18 between the lamp 3 and the heat-conducting wall 5 do not become effective. To limit the current, the output transformer 16 is configured to weaken the field. The output transformer 16 is, for example, a high-reactance transformer or a transformer such as the one disclosed in the German Laid Open Publication DE 195 33 323 A1, which is incorporated herein by reference.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A lighting unit, comprising:
   at least one lamp; and
   a hollow box;
   wherein the hollow box comprises:
      a heat-conducting wall in thermal contact with the at least one lamp;
      a rear wall extending essentially parallel to the heat-conducting wall and comprising at least one first opening;
      a top sidewall comprising at least one second opening disposed closer to the rear wall than to the heat-conducting wall; and
      a bottom sidewall comprising at least one third opening disposed closer to the rear wall than to the heat-conducting wall,
      wherein the top sidewall and the bottom sidewall are disposed between the rear wall and the heat-conducting wall.

2. The lighting unit as claimed in claim 1, wherein the heat-conductive wall comprises a reflective layer against which the at least one lamp rests.

3. The lighting unit as claimed in claim 2, wherein the reflective layer is one of a coating on the heat-conductive wall or a thin foil.

4. The lighting unit as claimed in claim 1, wherein a side of the heat-conductive wall facing an interior of the hollow box is black.

5. The lighting unit as claimed in claim 1, wherein the rear wall comprises at least one projection protruding into an interior of the hollow box.

6. The lighting unit as claimed in claim 1, wherein a total area of the at least one first opening is smaller than a remaining area of the rear wall.

7. The lighting unit as claimed in claim 1, wherein the at least one first opening, the at least one second opening, and the at least one third opening are fashioned respectively as slots.

8. The lighting unit as claimed in claim 7, wherein the at least one first opening is longitudinally oriented between the top sidewall and the bottom sidewall.

9. The lighting unit as claimed in claim 1,
wherein the rear wall comprises a plurality of first openings, the top sidewall comprises a plurality of second openings, and the bottom sidewall comprises a plurality of third openings,
wherein, in areas where the rear wall and the top sidewall adjoin, corresponding first openings and second openings merge to form respective single top openings, and
wherein, in areas where the rear wall and the bottom sidewall adjoin, corresponding first openings and third openings merge to form respective single bottom openings.

10. The lighting unit as claimed in claim 1, wherein the hollow box has a two-part construction, wherein a first part comprises the heat-conducting wall and a second part comprises the rear wall, the top sidewall and the bottom sidewall; and
wherein the rear wall, the top sidewall and the bottom sidewall are made of a material that conducts heat poorly relative to a material that forms the heat-conducting wall.

11. The lighting unit as claimed in claim 1, wherein the at least one lamp is a fluorescent lamp connected to a driver circuit with a low output impedance.

12. The lighting unit as claimed in claim 11,
wherein the fluorescent lamp is connected directly to an inductive output transformer of the driver circuit; and
wherein the output transformer is configured to limit transmitted power of the output transformer.

13. The lighting unit as claimed in claim 1, wherein the top sidewall and the bottom sidewall comprise no further openings disposed between the second opening and the heat-conducting wall, and the third opening and the heat-conducting wall, respectively.

14. The lighting unit as claimed in claim 1, wherein the lighting unit is configured to provide backlighting for a flat panel display device that is operated in substantially a vertical working position.

15. The lighting unit as claimed in claim 1, wherein the at least one lamp comprises a plurality of the lamps.

16. The lighting unit as claimed in claim 1, wherein the at least one first opening comprises a plurality of the openings.

* * * * *